United States Patent Office 2,810,741
Patented Oct. 22, 1957

2,810,741

ORTHO-CARBOXY-SUBSTITUTED AROMATIC PHOSPHATES AND METHOD OF PREPARING SAME

Harry Sobotka, New York, and Jacob D. Chanley, Jackson Heights, N. Y., assignors to Mount Sinai Hospital Research Foundation, Inc., a membership corporation of New York No Drawing. Application March 16, 1953,
Serial No. 342,746

10 Claims. (Cl. 260—461)

This invention relates to ortho-carboxy-substituted aromatic phosphates and to a method of preparing same. More particularly, this invention relates to salicyl phosphates and to a method of preparing same.

Previously it was reported that salicylic acid had been reacted with phosphorus pentachloride and the resulting reaction product distilled to remove impurity-forming materials, and the distillate then hydrolyzed by the addition of water; see R. Anschuetz et al., Ann. 228, 308 (1885). As described, the hydrolysis reaction was carried out in a two-phase, liquid, heterogeneous system wherein the reaction product of the salicylic acid and the phosphorus pentachloride was dissolved in one liquid phase, such as in a hydrocarbon solution, and to which water necessary to carry out the hydrolysis reaction was added as a separate, immiscible, liquid phase. The product obtained was reported as having a melting point in the range 140–150° C. Investigations made to carry on the reaction in the manner reported by Anschuetz et al. indicate that the reported product is a relatively impure product and that the yield is very low and unsatisfactory.

We have found that when salicylic acid and phosphorus pentachloride are reacted and then, without any intervening distillation step, the reaction mixture is hydrolyzed under the conditions hereinafter more fully set forth, it is possible to separate out and recover a stable, crystalline product in high yield and purity and having a melting point in the range 162.5–163° C.

We have also found that this product and related water-soluble salts display certain unique properties which make them useful as therapeutic agents, particularly as substitutes for salicylic acid and its acetyl derivative.

The use of salicylic acid and its acetyl derivative for therapeutic purposes is well known. Unfortunately the administration of these compounds in many instances produces undesirable untoward reactions as evidenced by certain gastric symptoms. These untoward reactions are produced both by the acid reaction of salicylic acid and in the case of the acetyl derivative (aspirin) by the hydrolysis of this compound in the stomach. Furthermore, it is not only the presence of the resulting hydrogen ions produced by the hydrolysis of these compounds but also the specific effect of the difficultly soluble salicylic acid and acetyl salicylate upon the gastric mucosa which are the cause of these untoward reactions.

It is an object of this invention to provide an improved process for the manufacture of ortho-carboxy-substituted aromatic phosphates and particular salicyl monophosphates.

It is another object of this invention to provide a process wherein the hydrolysis of the reaction product of an ortho-hydroxy-carboxy-substituted aromatic hydrocarbon and phosphorus pentachloride is carried out in a single homogeneous liquid phase.

It is still another object of this invention to provide a process for the manufacture of salicyl phosphates in high yield and high purity.

Still another object of this invention is to provide a process for the manufacture of novel ortho-carboxy-substituted aromatic phosphates and especially their sodium salts.

An object in accordance with another aspect of this invention is to provide salicylic acid derivatives which are not hydrolyzed in the stomach into more acidic products, but which yield, upon hydrolysis and ionization, the salicylate ion further down in the gastro-intestinal tract and to avoid thereby the above-mentioned undesirable untoward reactions. A further object of this invention is to provide salicylic acid derivatives which are very water-soluble so as to pass through the stomach as quickly as possible and which are also palatable and rapidly absorbed and demonstrable in the blood circulation. These and other objects of this invention and how they are obtained will become apparent from the accompanying disclosure.

In accordance with this invention it has been discovered that ortho-carboxy-substituted aromatic phosphates, particularly salicyl phosphates, can be expeditiously prepared in high yield and high purity by carrying out the hydrolysis of the reaction product of an ortho-hydroxy-carboxy-aromatic hydrocarbon and phosphorus pentachloride in the presence of a single, homogeneous liquid phase. More particularly, the above-identified reaction product is dissolved in a liquid aromatic hydrocarbon to which is added a sufficient amount of a non-hydroxy, water-miscible, aromatic-hydrocarbon-miscible, organic solvent in an amount sufficient at least to solubilize in said liquid aromatic hydrocarbon the water required to carry out the subsequent hydrolysis of the reaction product. Upon the addition of the water necessary for the hydrolysis to this solvent mixture, a single liquid phase exists since the added water is solubilized in the aromatic hydrocarbon by the non-hydroxy solvent. As a result a multi-phase heterogeneous liquid system is not formed and the hydrolysis reaction readily takes place and can be easily controlled in the substantial absence of any undesirable side reaction and decomposition or the like leading to the formation of products other than the desired one.

The ortho-carboxy-hydroxy-substituted aromatic hydrocarbons which can be reacted with phosphorus pentachloride in the practice of this invention include salicylic acid, 1-hydroxy-2-carboxy naphthalene, 1-carboxy-2-hydroxy naphthalene, 2-hydroxy-3-carboxy naphthalene and 1-hydroxy-8-carboxy naphthalene. Other ortho-hydroxy-carboxy substituted aromatic hydrocarbons can be reacted, especially the corresponding alkyl-substituted aromatic hydrocarbons.

The aromatic hydrocarbons which may be employed as a component of the solvent mixture making up the single homogeneous liquid phase in which hydrolysis takes place, includes the liquid aromatic hydrocarbons such as benzene and toluene. Other liquid aromatic hydrocarbons are suitable in the practice of this invention, such as the xylenes, ethylbenzene and other well known alkyl-substituted aromatic hydrocarbons.

The non-hydroxy, organic solvent which makes up the other component of the homogeneous solvent mixture in accordance with this invention includes any such solvent which is substantially inert during the hydrolysis reaction and which does not interfere with or react with the resulting hydrolyzed product. Suitable liquid, organic, non-hydroxy solvents include the ketones such as acetone and methyl ethyl ketone.

Accordingly, any organic solvent is suitable provided it is compatible with the aromatic hydrocarbon in the resulting solvent mixture to the extent to solubilize therein the water added for the hydrolysis reaction so as to form a single liquid homogeneous phase without the formation of a multi-phase liquid heterogeneous system. The amounts of aromatic hydrocarbon and non-hydroxy organic solvent necessary to maintain a single homogeneous liquid phase during the hydrolysis reaction varies to some extent with the temperature, the character of the aromatic hydrocarbon and non-hydroxy organic-solvent and the amount of water added. It has been found that substantially equal volumes of an aromatic hydrocarbon and a non-hydroxy organic solvent, such as benzene and acetone, respectively, yield a suitable solvent mixture for the maintenance of a single, homogeneous liquid phase during the hydrolysis reaction, especially so where the amount of water added amounts to about 10% by volume of the solvent mixture. It has also been found, for example, that the volume ratio of a non-hydroxy, oxygenated, organic solvent, such as acetone, to water so as to solubilize the water in an aromatic hydrocarbon, such as benzene, is about 5:1 at a temperature of about 0° C. The above proportions are, of course, merely illustrative and are not limitive of the practice of this invention since other suitable proportions may be employed depending upon the temperature, the amount of water and the particular hydrocarbon and non-hydroxy solvent employed.

The following example is typical of the practice of this invention as applied to the preparation of a salicyl phosphate such as mono (2-carboxy-phenyl) phosphoric acid.

Example No. 1

A mixture of phosphorus pentachloride (54.8 grams, 0.27 mol.) and salicyclic acid (38.5 grams, 0.28 mol.) was allowed to react at room temperature under anhydrous conditions in a one-liter flask. The reaction proceeded rapidly at room temperature without the addition of heat and the reaction mixture liquefied within one-half hour. The reaction was brought to completion by warming on a water bath (60–65° C.) for one-half hour. The resulting reaction product was then cooled in an ice bath (about 0° C.) and dissolved in 100 ml. of acetone and 100 ml. of benzene. To the resulting reaction product solution 14.0 ml. (0.78 mol.) of water was slowly added with agitation. The hydrolysis reaction proceeded rapidly upon the addition of the water since the reaction is exothermic. After standing for about one-half hour in the ice bath, 200 ml. benzene were added (bringing the volume ratio of benzene:acetone to 3:1), and the mixture allowed to stand overnight at room temperature. A crystalline precipitate insoluble in benzene formed. The precipitate was recovered by filtration and washed with small portions of benzene (ether is also suitable) and then dried overnight in a vacuum over potassium hydroxide. Forty-eight grams, equivalent to 82% of the theoretical yield of mono (2-carboxy-phenyl) phosphoric acid, were obtained as a white, crystalline, non-hygroscopic product. This material was recrystallized by dissolving in a boiling solution of 430 ml. of acetone containing 2.5 ml. (0.5% vol.) water since the crystalline product is substantially insoluble in anhydrous acetone. Upon the addition of 650 ml. of benzene to the resulting hot solution small needles of a crystalline product were obtained. The amount of pure, recrystallized product amounted to 36 grams, equivalent to a theoretical yield of 60%. The final recrystallized product was stable, extremely soluble in water, gave no ferric chloride test and no test for free phosphoric acid and had a melting point in the range 162.5–163° C. Set forth below are the chemical equations representative of the reactions taking place in the above-described method for the preparation of mono (2-carboxy-phenyl) phosphoric acid.

(1) Salicyclic acid

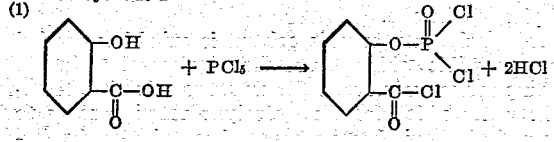

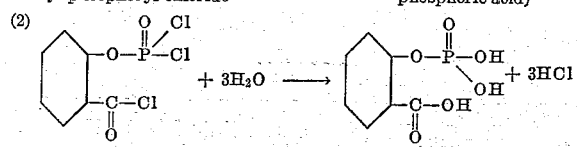

The ortho-carboxy-substituted aromatic phosphates such as mono (2-carboxy-phenyl) phosphoric acid can be reacted with basic acting compounds to form the corresponding salts. Suitable basic acting compounds which may be used include the alkali metal and alkaline earth compounds such as sodium, potassium and calcium compounds as well as the ammonium compounds. Basic acting organic compounds, especially the nitrogen bases such as the aliphatic and aromatic amines, are also suitable. Particularly interesting for pharmaceutical reasons are the salts derived from such basic acting, organic nitrogen-containing compounds as the alkaloids, such as quinine and quinidine. The various organic basic acting compounds such as 8-hydroxy quinoline, aniline, pyridine, piperidine, pyrimidine, pyrazine and their basic acting derivatives are also suitable for forming salts with the subject phosphates.

Of special interest and value, particularly from a therapeutic point of view, are the water-soluble salts, especially the mono-, di- and trisodium salts of mono (2-carboxy-phenyl) phosphoric acid. These sodium salts are readily prepared by reacting mono (2-carboxy-phenyl) phosphoric acid with a basic acting sodium compound followed by precipitation with ethyl alcohol. Suitable basic acting sodium compounds include sodium carbonate, sodium bicarbonate, sodium hydroxide and sodium ethylate. The resulting sodium salts are highly water soluble and are especially useful as therapeutics in the treatment of rheumatic diseases and as a substitute for aspirin and salicylic acid.

The monosodium salt has the formula:

(3)

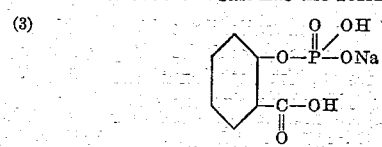

It is extremely soluble in water and is difficultly crystallizable from aqueous solutions.

The disodium salt is a white, crystalline solid having the formula:

(4)

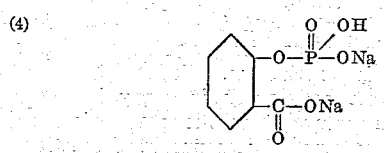

The disodium salt forms a neutral aqueous solution and is extremely soluble in water. The disodium salt does not appear to have a distinct melting point but decomposes at about 310° C.

The trisodium salt is a white, crystalline solid and has the formula:

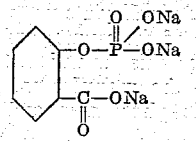

The trisodium salt is also extremely soluble in water producing a slightly basic solution. The trisodium salt starts to fuse at about 170° C. and turns brown and rapidly decomposes at 255° C.

The potassium and ammonium salts are formed in the same manner as the sodium salts and are equally water soluble.

Calcium salts such as

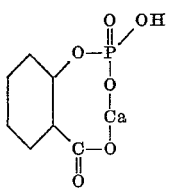

are prepared by reacting mono (2-carboxy-phenyl) phosphoric acid with an equivalent amount of calcium carbonate. The dibasic salts formed by neutralization of mono (2-carboxy-phenyl) phosphoric acid with an alkaloid such as quinine and quinidine are notable in that these salts are both water soluble and alcohol soluble.

The mono-, di- and tri-sodium salts of mono (2-carboxy-phenyl) phosphoric acid display a paradoxical pH-stability in aqueous solutions which makes these salts, in view of their water solubility, especially useful as therapeutic agents. Generally, it is well known that esters are hydrolyzed in the presence of hydrogen or hydroxyl ions and that aqueous solutions of esters are most stable under conditions where the concentration of these ions is low; that is, at the neutral point or at a pH of about 7.0. This situation is true for acetyl salicylate. In contrast, however, the above salts as well as mono (2-carboxy-phenyl) phosphoric acid are completely stable in basic solutions having a pH greater than 9, and are very stable in acidic solutions having a pH less than 3, but at a pH in the range 5–6, and more particularly in the range 5.3–5.7, these salts are rapidly hydrolyzed, having a half-life period of about two hours, and form salicylic acid.

Our explanation of this phenomenon is that this strange behavior is specific to ortho-carboxy-substituted aromatic phosphates as exemplified by the ortho-carboxyphenol and ortho-carboxy-napthol phosphates because of the ortho-carboxy group. It is submitted that the ortho-carboxy group is responsible for a so-called "participation" reaction which occurs primarily for the doubly dissociated form, the di-ion having the formula:

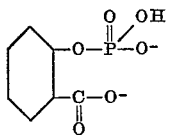

and which is most prevalent at a pH of about 6.

The following is indicative of the therapeutic value of these materials. When the trisodium salt of mono (2-carboxy-phenyl) phosphoric acid or the disodium salt, preferably a mixture of the two, together with a suitable amount of sodium carbonate and some water soluble excipient such as lactose are dissolved in water and taken internally, the salts are converted into the free acid when the solution reaches the stomach (pH 1.5–3.0) without being precipitated or hydrolyzed. However when the solution reaches the duodenum (pH 6–7) the di-ion is formed and is rapidly hydrolyzed to form salicylic acid at a place where it may be most effective for certain therapeutic purposes.

The following example is exemplary of the therapeutic benefits obtainable by employing these salts.

Example No. II

Six hundred milligrams of the disodium salt of mono (2-carboxy-phenyl) phosphoric acid were administered to subjects weighing 40–55 kgs. Within thirty to ninety minutes afterwards 8 to 13 milligrams of salicylic acid per 100 ml. of blood serum were detected, according to the method of Volterra and Jacobs. The analgesic effects observed corresponded to those produced by acetyl salicylate but any untoward gastric symptoms were absent.

The foregoing disclosure is merely illustrative and not limitive of this invention since many substitutions, modifications and changes which do not depart from the spirit and scope of this invention are possible.

We claim:

1. A method of preparing ortho-carboxy-substituted aromatic phosphates which comprises reacting under anhydrous conditions phosphorus pentachloride and a compound selected from the group consisting of salicylic acid and the ortho-carboxy-hydroxy-substituted naphthalenes and the alkyl substituted derivatives of salicylic acid and said naphthalenes to form the corresponding phosphoryl chloride derivative of said compound, hydrolyzing said derivative by adding thereto water in the presence of a liquid aromatic hydrocarbon and a non-hydroxy, water-soluble, oxygenated, organic solvent, said hydrocarbon and said solvent being present in amounts sufficient to form a single, homogeneous liquid phase with said water and recovering the resulting ortho-carboxy-substituted aromatic phosphate.

2. A method according to claim 1 wherein said compound is salicylic acid.

3. A method according to claim 1 wherein said compound is an ortho-carboxy-hydroxy-substituted-naphthalene.

4. A method according to claim 1 wherein said organic solvent is acetone.

5. A method according to claim 1 wherein said organic solvent is methyl ethyl ketone.

6. A method of preparing mono(2-carboxy-phenyl) phosphoric acid which comprises reacting phosphorus pentachloride and salicylic acid under anhydrous conditions to form salicyl phosphoryl chloride, adding an amount of water sufficient to hydrolyze said phosphoryl chloride together with a liquid aromatic hydrocarbon and a non-hydroxy, water-soluble, oxygenated, organic solvent, said hydrocarbon and said solvent being added in amounts sufficient to form a single, homogeneous liquid phase with said water, reacting said water with said salicyl phosphoryl chloride to form mono(2-carboxy-phenyl) phosphoric acid and recovering said acid from the resulting reaction mixture by crystallization.

7. A method according to claim 6 wherein said solvent is acetone and said aromatic hydrocarbon is benzene.

8. A method of preparing mono(2-carboxyphenyl) phosphoric acid which comprises reacting under anhydrous conditions one mol of phosphorus pentachloride with one mol of salicylic acid to form salicyl phosphoryl chloride, dissolving said salicyl phosphoryl chloride in a liquid solvent mixture made up of substantially equal parts by volume acetone and benzene, hydrolyzing said salicyl phosphoryl chloride by gradually adding to the resulting solution an amount of water sufficient to substantially completely react with said salicyl phosphoryl chloride in a single homogeneous liquid phase without forming two heterogeneous liquid phases upon admixture with said solvent mixture.

9. In the method for the preparation of mono(2-carboxy-phenyl) phosphoric acid wherein salicyl phosphoryl chloride is reacted with the requisite amount of water, the improvement which comprises reacting salicyl phosphoryl chloride with said water in a single, homogeneous liquid phase including a liquid aromatic hydrocarbon and a non-hydroxy water-soluble, oxygenated, organic solvent.

10. In the method set forth in claim 9 wherein said homogeneous liquid phase comprises substantially equal parts by volume acetone and benzene.

References Cited in the file of this patent

UNITED STATES PATENTS

| | | |
|---|---|---|
| 1,559,600 | Wintsch | Nov. 3, 1925 |
| 2,259,452 | Berger et al. | Oct. 21, 1941 |
| 2,279,218 | Badertscher et al. | Apr. 7, 1942 |
| 2,320,588 | Graenacher et al. | June 1, 1943 |
| 2,373,286 | Badertscher et al. | Apr. 10, 1945 |